(12) United States Patent
Meyer et al.

(10) Patent No.: US 9,173,012 B2
(45) Date of Patent: Oct. 27, 2015

(54) HIGH CAPACITY SWITCHING SYSTEM

(75) Inventors: Gerhard Meyer, Eggolsheim (DE); Herbert Haunstein, Dormitz (DE)

(73) Assignee: Alcatel Lucent, Boulogne-Billancourt (FR)

( * ) Notice: Subject to any disclaimer, the term of this patent is extended or adjusted under 35 U.S.C. 154(b) by 295 days.

(21) Appl. No.: 13/513,725

(22) PCT Filed: Nov. 26, 2010

(86) PCT No.: PCT/EP2010/068335
§ 371 (c)(1), (2), (4) Date: Jun. 4, 2012

(87) PCT Pub. No.: WO2011/073015
PCT Pub. Date: Jun. 23, 2011

(65) Prior Publication Data

US 2012/0243868 A1  Sep. 27, 2012

(30) Foreign Application Priority Data

Dec. 18, 2009  (EP) .................................... 09306284

(51) Int. Cl.
*H04J 14/00* (2006.01)
*H04Q 11/00* (2006.01)
*H04Q 11/06* (2006.01)

(52) U.S. Cl.
CPC .......... *H04Q 11/0005* (2013.01); *H04Q 11/06* (2013.01); *H04Q 2011/005* (2013.01);
(Continued)

(58) Field of Classification Search
USPC .......................................................... 398/45
See application file for complete search history.

(56) References Cited

U.S. PATENT DOCUMENTS 6,038,044 A * 3/2000 Fee et al. ......................... 398/56
6,535,313 B1 * 3/2003 Fatehi et al. ................... 398/101
(Continued)

FOREIGN PATENT DOCUMENTS

CN  101132286  2/2008
CN  101155120  4/2008
(Continued)

OTHER PUBLICATIONS

Keslassy, Isaac et al; Scaling Internet Routers Using Optics; Computer Communication Review, ACM, New York, NY, USA; vol. 33, No. 4; Oct. 1, 2003; pp. 189-200; XP001224080; ISSN: 0146-4833.
(Continued)

*Primary Examiner* — Ken Vanderpuye
*Assistant Examiner* — Amritbir Sandhu
(74) *Attorney, Agent, or Firm* — Patti & Malvone Law Group, LLC

(57) ABSTRACT

An exemplary apparatus is provided for a high capacity switching system for use in a transport network, which contains a number of input and output subsystems and a central interconnection means configurably interconnecting the input and output subsystems. The subsystems have input and output line modules for receiving and transmitting data signals to and from transmission lines of the network, one or more link modules connecting the subsystems to the interconnection means, and local switching means switching data signals in time and space domain between the input and output modules and the one or more link modules within one subsystems. The link modules are adapted to aggregate data signals from different input and output line modules of the same input and output subsystems and destined to input and output line modules of another one of the input and output subsystems into signal bursts and add a payload gap to each signal burst.

10 Claims, 3 Drawing Sheets

(52) U.S. Cl.
CPC ............ *H04Q2011/0018* (2013.01); *H04Q 2011/0024* (2013.01); *H04Q 2011/0033* (2013.01); *H04Q 2011/0052* (2013.01)

(56) References Cited

U.S. PATENT DOCUMENTS

| | | | |
|---|---|---|---|
| 6,693,902 B1* | 2/2004 | Sahlman et al. | 370/369 |
| 6,721,315 B1* | 4/2004 | Xiong et al. | 370/389 |
| 7,187,654 B1* | 3/2007 | Beshai et al. | 370/251 |
| 7,215,666 B1* | 5/2007 | Beshai et al. | 370/380 |
| 7,519,055 B1* | 4/2009 | Zheng et al. | 370/389 |
| 7,535,893 B1* | 5/2009 | Beladakere et al. | 370/353 |
| 7,711,007 B2* | 5/2010 | Bleisteiner et al. | 370/490 |
| 7,764,882 B2* | 7/2010 | Beacken | 398/49 |
| 7,933,203 B2* | 4/2011 | Hahm | 370/230.1 |
| 8,150,264 B2* | 4/2012 | Tang et al. | 398/82 |
| 8,190,035 B2* | 5/2012 | Blauvelt | 398/202 |
| 8,229,300 B2* | 7/2012 | Bogoni et al. | 398/45 |
| 8,705,958 B2* | 4/2014 | Mori et al. | 398/43 |
| 2002/0018263 A1* | 2/2002 | Ge et al. | 359/128 |
| 2002/0054732 A1* | 5/2002 | Zheng | 385/24 |
| 2002/0063926 A1* | 5/2002 | Nishi et al. | 359/128 |
| 2002/0085491 A1* | 7/2002 | Beshai et al. | 370/230 |
| 2006/0062575 A1* | 3/2006 | Zami et al. | 398/45 |
| 2006/0251418 A1* | 11/2006 | Schafer et al. | 398/45 |
| 2007/0189285 A1* | 8/2007 | Choi et al. | 370/389 |
| 2007/0242691 A1* | 10/2007 | Rhee et al. | 370/465 |
| 2009/0041457 A1* | 2/2009 | Maki et al. | 398/45 |
| 2009/0129775 A1* | 5/2009 | Handelman | 398/47 |
| 2010/0157994 A1* | 6/2010 | Beisel et al. | 370/355 |

FOREIGN PATENT DOCUMENTS

| | | |
|---|---|---|
| EP | 1641191 | 3/2006 |
| EP | 1699257 | 9/2006 |
| EP | 2200200 | 6/2010 |
| KR | 1019920019007 | 10/1992 |
| KR | 1019930024350 | 12/1993 |
| WO | 2004052045 | 6/2004 |

OTHER PUBLICATIONS

Bin Wu et al; Two-Layer Parallel Switching: A Practical and Survivable Design for Performance Guaranteed Optical Packet Switches; Global Telecommunications Conference, 2005; Globecom '05; IEEE St. Louis, MO; USA; Nov. 28-Dec. 2, 2005; Piscataway, NJ; USA; IEEE LNKD-DOI:10.1109/GLOCOM.2005.1577998; vol. 4, Nov. 28, 2005; pp. 1905-1909; XP010879577; ISBN: 978-0-7803-9414-8.

Xin Li et al; Analysis of Reduced Rate Scheduling for Switches with Reconfiguration Overhead; Globecom '03; 2003—IEEE Global Telecommunications Conference, Conference Proceedings, San Francisco, CA Dec. 1-5, 2003; [IEEE Global Telecommunications Conference], New York, NY; IEEE, US LNKD-DOI:10.1109/GLOCOM.2003.1258742; vol. 5, Dec. 1, 2003; pp. 2782-2786; XP010677618; ISBN: 978-0-7803-7974-9.

\* cited by examiner

HIGH CAPACITY SWITCHING SYSTEM

FIELD OF THE INVENTION

The present invention relates to the field of telecommunications and more particularly to a high capacity network node for use in optical transport networks.

BACKGROUND OF THE INVENTION

In optical transport networks, network nodes are needed, which can flexibly switch high amounts of high speed data signals between a large number of input and output ports. Today, optical interfaces are available for signal rates of up to 40 Gbit/s and interfaces for signal rates of 100 Gbit/s are in the pipeline. The overall traffic capacity large network nodes can handle today is in the range of up to few terabit per second. Such network nodes are based on high-speed electrical signal switching.

Given the ever growing traffic demand in core networks, it can be anticipated that in the future network nodes with again higher switching capacity will be needed. Network nodes that perform switching in the electrical domain will be limited in size in terms of floor space and power consumption. All-optical switch technology is under development, but currently, optical switches are not yet available that allow to switch 100 Gbit/s signals in STS-1 or packet granularity at least not for big switches, and will be quite costly once mature.

SUMMARY OF THE INVENTION

The present invention provides a high capacity switching system for use in a transport network, which contains a number of input/output subsystems and a central interconnection means configurably interconnecting the input/output subsystems. The subsystems have input/output line modules for receiving and transmitting data signals to and from transmission lines of the network, one or more link modules connecting the subsystems to the interconnection means, and local switching means switching data signals in time and space domain between the input/output modules and the one or more link modules within one subsystems. The link modules are adapted to aggregate data signals from different input/output line modules of the same input/output subsystems and destined to input/output line modules of another one of said input/output subsystems into signal bursts and add a payload gap to each signal burst. The switching system further has a scheduler which configures the interconnection means during the payload gaps to switch the signal bursts to their destination subsystems.

In a particular embodiment, the interconnection means comprise optical fiber interconnections arranged in the form of a bidirectional optical ring connecting any to any of said subsystems. Optical transmitters are located at the link modules, which transmit at a unique wavelength, each and tunable optical receivers are located at the link modules, too, for receiving signal bursts from the optical fiber ring.

In an alternative embodiment, the interconnection means are implemented using an optical space switching matrix.

The embodiments provide a scalable and flexible solution for the ever growing traffic demand, that can be implemented at low costs. Particularly the optical ring implementation provides advantages in terms of redundancy, costs, and power consumption. Moreover, it allows a very efficient implementation of multicast connections.

BRIEF DESCRIPTION OF THE DRAWINGS

Preferred embodiments of the present invention will now be described with reference to the accompanying drawings in which.

DETAILED DESCRIPTION OF THE INVENTION

In view of the limitations and shortcomings of existing switching systems, the inventors have thought of a new node architecture and switching principle to realize high capacity high speed optical network nodes. The switching system employs a number of input/output shelves which carry a number of I/O cards where the transmission traffic such as IP traffic, SONET/SDH/OTH traffic, or Ethernet traffic enters the system, and a central switch fabric and control subsystem. In a preferred embodiment, the switch fabric has of a simple drop and continue architecture based on wavelength division multiplexing. Fast tunable receivers will be used to selects the appropriate traffic signals, as will be explained in more detail below.

Figure 1:
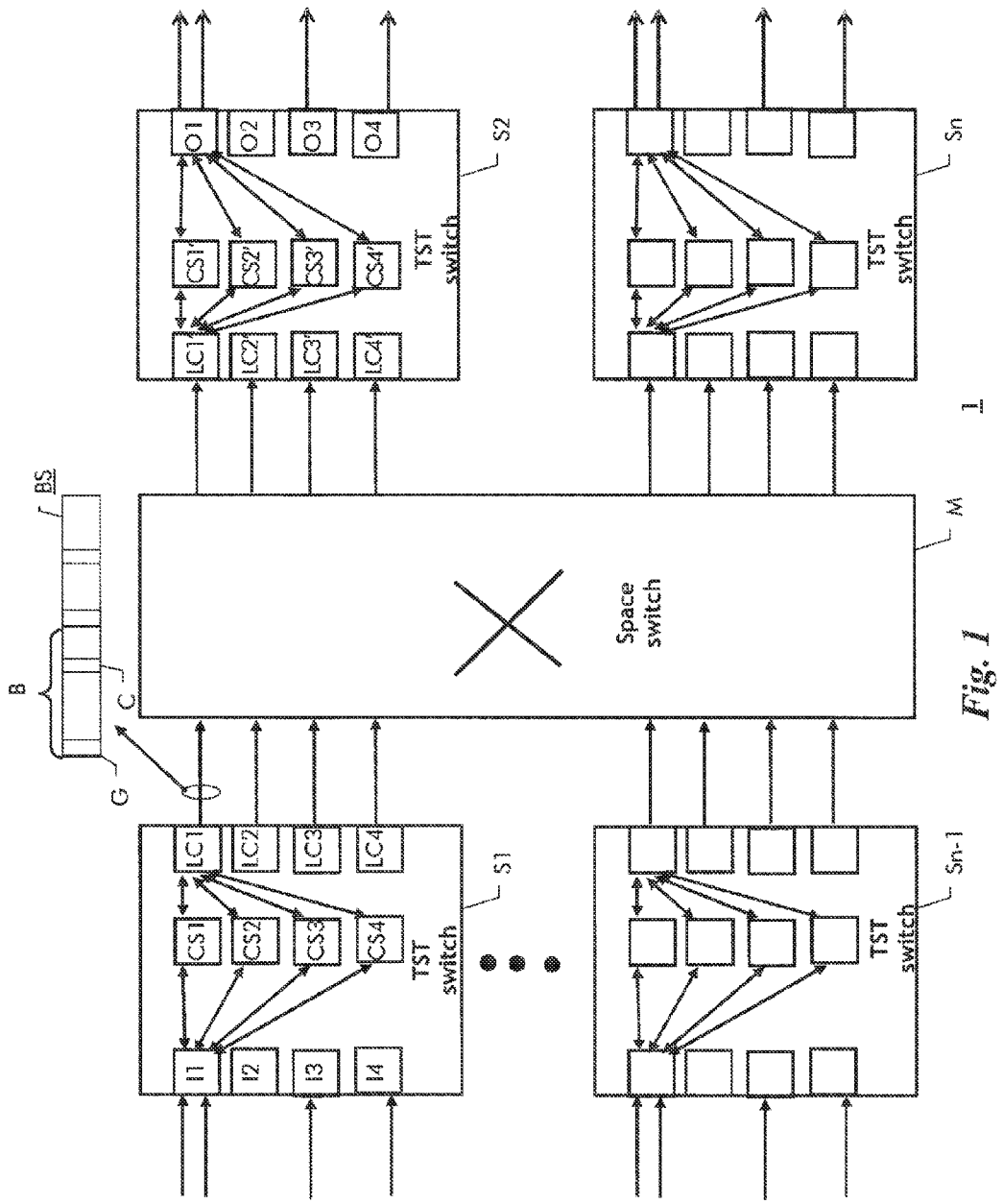
FIG. 1 shows a first embodiment of a high capacity network node utilizing an optical crossbar switch.

FIG. 1 shows in a first embodiment the design of a large switching system 1 with a number of I/O shelves S1-Sn, which are interconnected through a central space switch matrix M. For the sake of simplicity, the direction of traffic flow is shown from the left to the right. However, it should be understood that all signal paths in reality are bidirectional and each I/O shelf has receivers as well as transmitters integrated on the same I/O boards for both directions. However, in the following description, the shelves on the left hand side are shown with only their receiver function for the switching system 1 while the shelves on the right hand side are shown with only their transmitter function.

Each of the input side shelves S1, . . . , Sn-1 has a number of input line cards or modules I1-I4, a number of center stage switches CS1-CS4, and a number of link cards LC1-LC4. Each of the input line cards I1-I4 is connected via each center stage switch CS1-CS4 to each link card LC1-LC4, as is shown by way of example for only the connections of input line card I1 and of link card LC1. In this embodiment, there are shown four input cards, four center stage switch cards and four link cards. However, the embodiment is not limited to this particular numbers and the numbers of input line cards, of center stage switches and of link cards can be different from each other.

The center stage switches of the embodiment are agnostic cell switches. The input line cards provide adaptation functions of received traffic signals and segmentation function to chop traffic signals into cells of same length, and add address information indicative of an output port. For time-division multiplexed (TDM) traffic such as SDH or OTN frames, the input line cards provide further a time-switch function to interchange timeslot positions before the signal enters the center stage switches. The link cards aggregate received cells and feed them to the central switch matrix M. The link cards perform a time-switch function, as well, to switch the cells received from the center stage modules to the right timeslot positions in the signal towards to central switch matrix M. Each input shelve can hence provide a time-space-time (TST) switching function for TDM traffic.

In particular, the link cards provide at their output towards switch matrix M a burst structured output signal as shown schematically as signal BS. Burst signal BS contains signal bursts B of equal length, where each burst is destined for a particular output shelf. A signal burst B contains one or more cells C and begins with a payload gap G, which function will be explained below. The time switching function in each link card therefore aggregates cells from different input ports but destined for the same output shelf into the signal bursts B. Through this, the number of interconnect channels can be heavily reduced. To allow the gaps G in the signal, the signal bit rate has be increased. The bursts can essentially be seen as a timeslot in an internal time-division multiplexed signal and represent a particular payload channel, each. In addition to the payload channels, an OAM and control channel can be added to the internal signals, as will be explained further below.

The central switch matrix M is a space switch, which has a lower switching granularity and switching speed than the switches in the input and output shelves. Therefore, the gap G is used to gain the time needed to configure the switch matrix M on a per-burst basis. This concept can be applied to any combination of switching technologies with different switching speeds. In the preferred embodiment, the central switch matrix M is an optical switch and the link cards contain E/O converters to generate optical burst signals BS. An optical switch matrix can be realized for instance using a micromirror technology, liquid crystal technology, beam-steering switches in planar waveguide circuits, or tunable optical filter technology.

The output side shelves such as shelf S2 contain link cards LC1'-LC4', which receive the signals from the central switch matrix M, convert back to electrical domain and distribute the payload cells contained within the signal bursts B over a number of center stage switches CS1'-CS4' to the appropriate output line cards O1-O4. Output line cards have a reassembly function, which reassembles the payload signal for onwards transmission from the received signal cells. Similar as at the input side, shelf S2 performs a time-space-time switching function from the signal bursts received at the different link cards LC1'-LC4' to the outgoing data signals of output line cards O1-O4.

In brief, the switch concept proposed by the inventors employs multiple electrical time-space-time switches located in the ingress I/O shelves, which generate a new higher rate TDM signal with gaps (in terms of payload) between continuous bursts which carry the actual payload signals. Space switch M defines the egress I/O shelf. The egress I/O shelf provides a second electrical time-space-time switching function.

The input side I/O shelves represent a first switching stage, which allows for local and first stage switching to the other I/O shelves. All signals dedicated to ports which are not in the same I/O shelf are rearranged such that each burst contains a set of signals dedicated to one other shelf. The burst itself is sub-structured into cells to allow to maintain a very fine signal switching granularity, e.g. STS-1 equivalents. In addition to the time slot re-structuring, the payload gaps are introduced which leads to what may be called continuous bursts. The introduction of the gaps increases the transmission speed of the internal signal. The bursts are then switched in the center space stage M to the respective destination I/O shelf.

Since the center stage is using a different technology, e.g. optical crossbar or burst switching with a different switching speed, the gap allows for accommodating to this speed. The optical switch will be configured upfront of the coming burst by a central scheduler (not shown). Finally the signal is switched in the egress stage with fine granularity to the appropriate timeslot of the destined outgoing port. In case of broadcast or multicast, a burst can also be connected to several egress I/O shelves.

Figure 2:
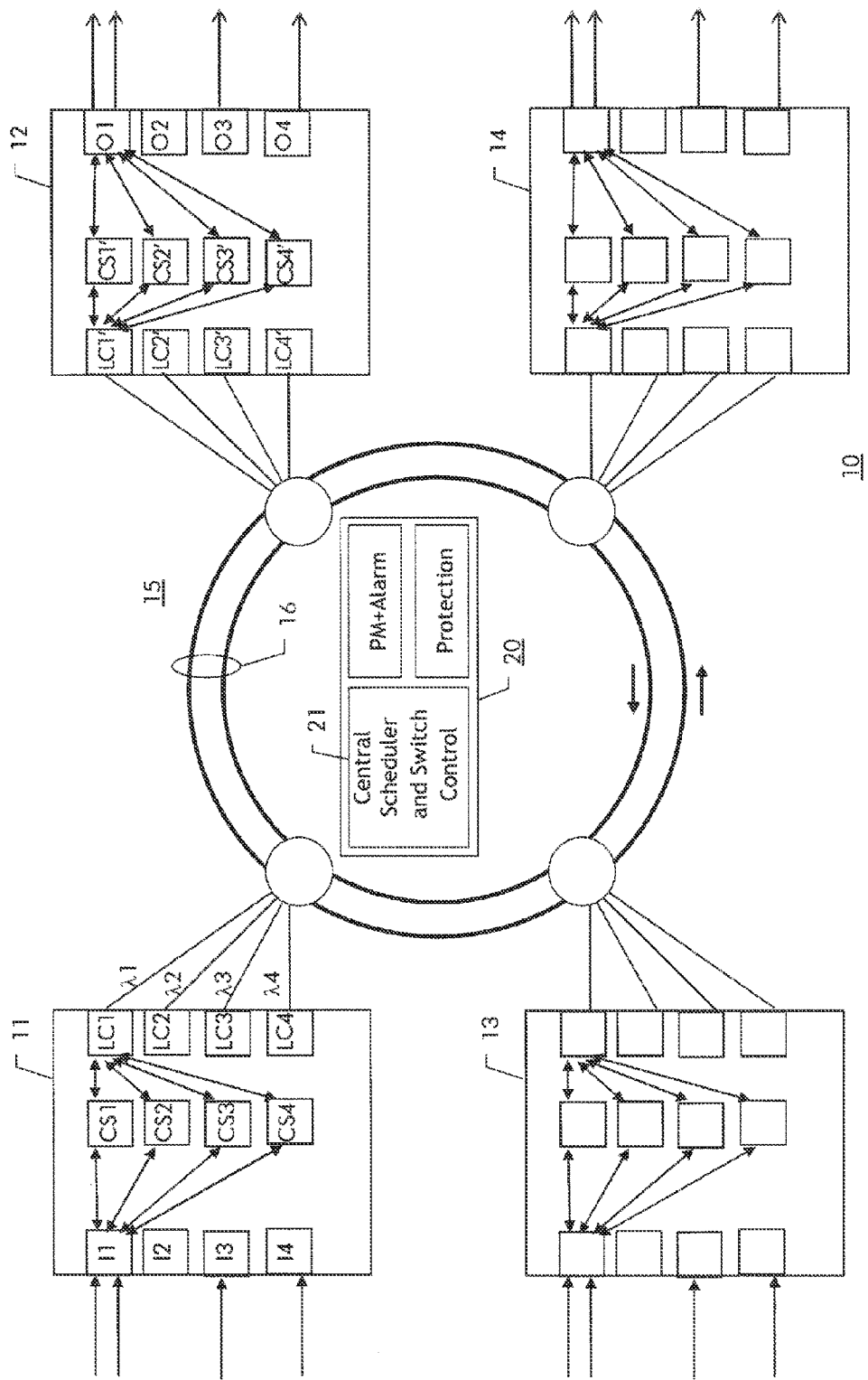
FIG. 2 shows a second embodiment a high capacity network node utilizing an optical ring.

FIG. 2 shows a block diagram of a favorable implementation of a switching system which makes use of wavelength division multiplexing and fast tunable receivers. Switching system 10 has four I/O shelves 11, 12, 13, 14, each of which is equipped with a number of I/O cards or modules. I/O shelves 11-14 are interconnected through a central switch fabric 15. Switch fabric 15 contains a bidirectional two fiber optical ring 16, to which each I/O shelf 11-14 is connected. The optical ring 16 carries all traffic from all shelves to all other shelves using wavelength multiplexing. Each shelf is assigned a different subset of wavelengths $\lambda 1$-$\lambda 4$ for transmission. The receivers on each shelf can be tuned to any of the wavelengths on a per-burst basis.

Instead of "real" switches, all signals from all link cards of all I/O shelves are routed along the optical ring 16 and can be received at all other I/O shelves. Each optical transmitter in link cards of the input side I/O shelves is assigned a unique wavelength, so that optical burst signals from different link cards and from different I/O shelves can be transmitted in parallel using wavelength multiplexing and can be separated at the appropriate receiver.

The optical ring 16 is a two-fiber ring, where all signals are fed to both rings but using opposite directions for protection purposes. It should be understood that an optical ring is just one possibility of interconnecting the I/O shelves. Other interconnection techniques such as optical bus, star or hub architecture could be used as well.

The receiver in the output side I/O shelf is tuned to the appropriate wavelength from burst to burst, i.e. on a per-burst basis. The payload gaps in the burst signals allows sufficient time to tune the optical receivers. Instead of a "real" gap, i.e. of a signal pause, the payload gap can contain a training signal to train the receiver in the tuning phase to the correct wavelength. This can speed up the tuning significantly. In operation, the receiver is tuned to a first wavelength to receive a first signal burst, then it is tuned to a second wavelength coming from a different I/O shelf to receive a second signal burst and so on. Optical switching in this embodiment is hence achieved through tuning of the receivers. A central scheduler 21 controls the I/O shelves so that the input side shelves map cells for a certain output side shelf into the appropriate signal burst and that the tunable receivers in the output side shelves are tuned at the right time to the right wavelength to receive a signal burst destined for this shelf.

In principle, it would equally be possible to assign fix wavelengths to the receivers and tune the transmitters on a per-burst basis. However, this would complicate the implementation of multicast interconnections, since the transmitter would than have to replicate the burst on each receiver wavelength to which the burst should go. Moreover, tunable transmitters would be more expensive as compared to fix wavelength transmitters and tunable receivers.

The scheduling can also be supported by a separate OAM and control channel, which is transmitted together with the payload channels but processed electrically to control the optical switching. A central control system 20 is provided for central control and scheduling. It contains the scheduler 21 as well as performance monitoring (PM) and alarm processing and protection switching controller functionality. The control, OAM and scheduling information is sent to the central control system 20 in parallel and scheduler 21 uses the switch control information to configure the optical switching function.

The scheduler 21 functions to coordinate the timing when the burst is sent at the transmitter and the timing when the receiver in the destination I/O shelf will be tuned to the transmitter wavelength to receive the burst. This coordination is simplified when all link cards are synchronized to transmit their bursts at same instants in time, so that the scheduler must only coordinate that no two transmitters transmit a burst for the same receiver at the same time.

As an alternative to a central control and scheduling system, a distributed scheduling system with input schedulers and output schedulers communicating with each other could be implemented. The communication between input and output schedulers can be realized with request and grant messages. Additionally, a central scheduler can be used to resolve congestions.

The overspeed factor, which allows to insert payload gaps to configure the optical switch, can be achieved through very efficient modulation formats such as optical OFDM (Orthogonal Frequency Division Multiplexing) using 64 QAM modulation.

Figure 3:
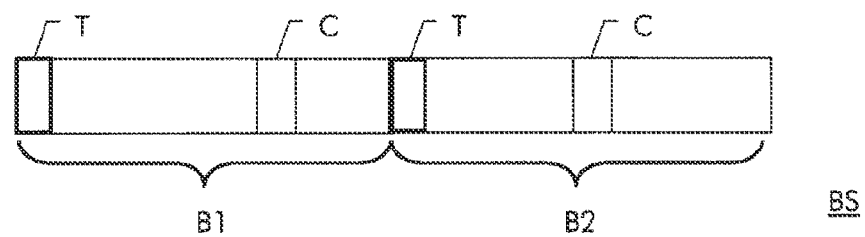
FIG. 3 shows an internal signal structure used in the network node of FIG. 2.

FIG. 3 shows an optical burst signal BS with a first burst B1 and a second burst B2. The payload gap at the beginning of each signal burst B1, B2 is filled with a training signal T. The payload portion of the bursts carry signal cells C. The training signal has a known signal patter, which allows to efficiently find the optimum wavelength. It could have a maximum number of signal transitions in the optical signal. The choice of signal pattern may depend on the modulation scheme actually used. For simple on-off keying, a pattern 10101010 . . . would for example represent a good choice.

The above described switching architecture will allow to build 10T/100T or even greater switching and routing systems in a very cost, power and size efficient way. For the I/O stages, existing switching systems such Alcatel Lucent's optical crossconnect 1870TTS can be reused. Local center stage switches in the I/O shelves can be implemented for instance as agnostic cell switches as described in EP1699257 and EP 1641191, or as described in European Patent Application "Network Element for Switching Time Division Multiplex Signals" having the application number 08172422, which are incorporated by reference herein.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventors to furthering the art.

To give a more concrete example for a preferred implementation, an I/O shelf can have 32 line cards, with a signal capacity of 100 G each. Towards the matrix, an I/O shelf will have a single link card carrying four transmitters operating at four different wavelengths. 15 (or 25) I/O shelves can be connected through the central switch function 15, thus carrying 60 (or 100) different wavelengths. Each wavelength will carry a burst signal at a signal rate of roughly 1 Tb/s. The total optical link length will be below 300 m.

In the I/O shelves, TDM traffic will be switched in time slots of multiples of about 53 Mbit/s (STS-1 equivalents). Payload bursts may have a length of 9.6 μsec, each. Tuning in the receiver can be achieved in roughly 20 ns. The training sequence of each burst can have for example a length of 80 ns.

The invention claimed is:

1. A switching system for use in a transport network, comprising:
a number of input and output subsystems; and
a central interconnection means to configurably interconnect the input and output subsystems;
wherein the input and output subsystems comprise:
input line modules to receive data signals from transmission lines of said transport network and output line modules to transmit the data signals to transmission lines of said transport network;
one or more link modules to connect said input and output subsystems to said central interconnection means; and
local switching means to switch the data signals in a time and space domain between said input and output line modules and said one or more link modules within said input and output subsystems;
wherein said link modules are adapted to aggregate the data signals from different input and output line modules of a same input and output subsystem and destined to input and output line modules of another one of said input and output subsystems into signal bursts and providing payload gaps to said signal bursts; and
wherein said switching system further comprises a scheduler to configure said central interconnection means during said payload gaps to switch said signal bursts to their destination subsystems.

2. The switching system according to claim 1, wherein said central interconnection means comprises:
optical fiber interconnections connecting any to any of said input and output subsystems;
optical transmitters located at said link modules, wherein each optical transmitter is adapted to transmit at a unique wavelength different from the wavelengths of any other of said optical transmitters; and
tunable optical receivers located at said link modules to receive signal bursts from said optical fiber interconnections.

3. The switching system according to claim 2, wherein said optical fiber interconnections are arranged to form a bidirectional optical ring.

4. The switching system according to claim 2, wherein said payload gaps comprise training signals to fast tune said tunable receivers.

5. The switching system according to claim 1, wherein said central interconnection means comprises an optical space switching matrix.

6. The switching system according to claim 1, wherein said local switching means are adapted to perform a time-space-time switching function.

7. The switching system according to claim 6, wherein said local switching means comprise:
first time switching means located at said input and output line modules to interchange timeslots in received data signals and data signals to be transmitted;
local center stage modules to perform a space switching function between said input and output line modules and said one or more link modules; and
second time switching means located at said one or more link modules to switch payload signals to and from said signal bursts.

8. The switching system according to claim 1, wherein said local switching means comprise cell switches, and wherein said input and output line modules comprise segmentation and reassembly devices to segment received data signals into cells of a same length and adding address information for said cell switches and to reassemble cells to form data signals to be transmitted.

9. The switching system according to claim 1, wherein said link modules transmit the data signals at a significantly higher data rate than said input and output line modules.

10. The switching system according to claim 1, wherein the link modules of all input and output subsystems are synchronized to transmit said signal bursts synchronously.

* * * * *